Jan. 19, 1971    N. R. BUTLER    3,555,719
FISHING ROD HOLDING ATTACHMENT FOR A TACKLE BOX
Filed April 21, 1969
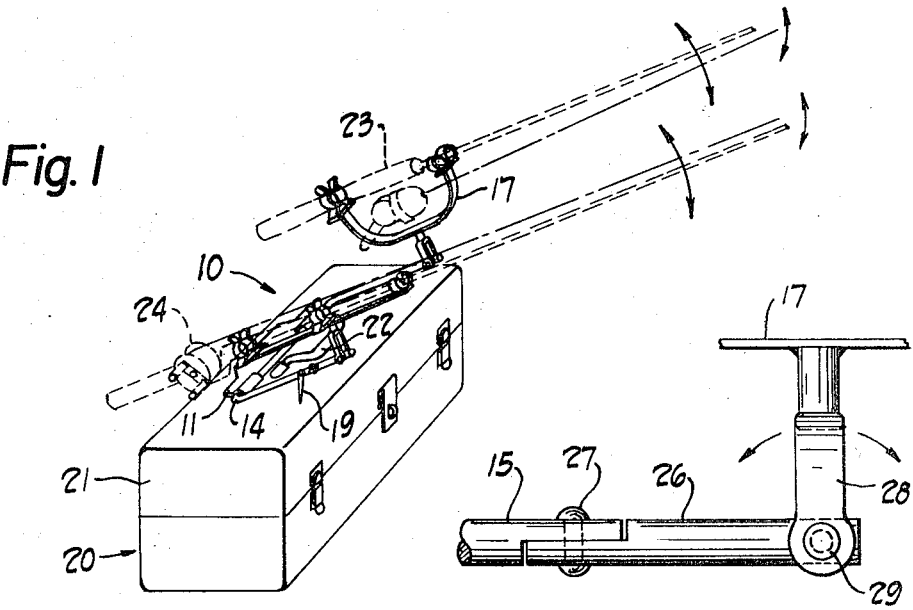
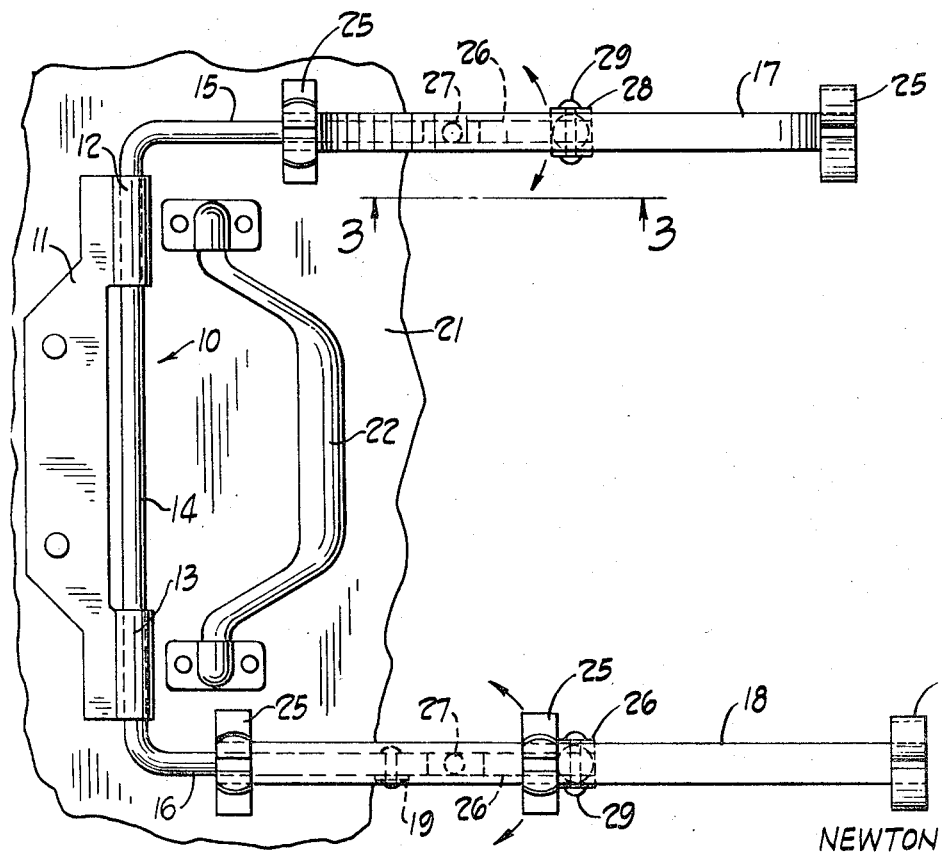
INVENTOR.
NEWTON R. BUTLER
BY
ATTORNEY.

United States Patent Office 3,555,719
Patented Jan. 19, 1971

3,555,719
FISHING ROD HOLDING ATTACHMENT FOR A TACKLE BOX
Newton R. Butler, 3532 E. 154th St.,
Cleveland, Ohio 44120
Filed Apr. 21, 1969, Ser. No. 817,743
Int. Cl. A01k 97/10
U.S. Cl. 43—54.5        2 Claims

ABSTRACT OF THE DISCLOSURE

A bracket arm is hingedly mounted on the lid of a tackle box for vertical movement relative to the lid, and a platform, having spaced clips for releasably anchoring a fishing rod thereto, is tiltably mounted on the bracket for both vertical and horizontal movement relative to the bracket.

---

Conducive to a better understanding of the invention it may be well to point out that a fisherman must constantly hold his rod while waiting for a bite. If he wants to move about, or use more than one rod at a time, it must be laid on the ground, where it may become dirty, or propped up in some manner against rocks, or the like.

Again, if fishing conditions are such that he must fish over a fence or railing, such as often happens when fishing off a pier or causeway, it is tiring to hold the rod at the necessary high angle required to clear the obstruction.

The primary object of this invention therefore, is to provide a fishing rod holder that can be mounted on a conventional tackle box, which the fisherman normally carries with him anyway, so that no extra equipment need be carried.

Another object is to provide a device of the type stated that will releasably hold a fishing rod at any desired elevated angle, leaving the fisherman free to move about.

These and other objects of the invention will become apparent from a reading of the following specification and claims, together with the accompanying drawing, wherein:

FIG. 1 is a perspective view of the fishing rod attachment for tackle boxes that is the subject of the invention, showing two types of fishing rods mounted thereon;

FIG. 2 is a top plan view thereof; and

FIG. 3 is a view taken along the line and in the direction of the arrows 3—3 of FIG. 2.

Referring more particularly to the drawing, there is seen in FIG. 1 the fishing rod holding attachment for tackle boxes that is the subject of the invention, broadly indicated by reference numeral 10, mounted on the lid 21 of a conventional tackle box 20.

The attachment 10 has a base plate 11, which is mounted on the tackle box lid 21, spaced from and parallel to the lid handle 22, as seen in FIG. 2.

The so-mounted structure 10, thus, does not interfere with the normal use of the handle 21, in carrying the tackle box.

A U-shaped bracket 14 is hingedly attached to the base 11 through hinge elements 12–13. The bracket 14 has two legs 15 and 16, which can be swung in a vertical plane, toward or away from the box lid 21.

A foot 19 is pivotally mounted on one leg 16, and acts to hold the bracket in an upwardly-tilted position, as seen in FIG. 1, when the foot 19 is in its dependent position.

When the attachment 10 is not in use the bracket 14 can be positioned flat against the lid 21 by moving the foot 19 to a position parallel to the bracket leg 16.

Reference numerals 26 indicate extension links swivelly mounted at the terminal end of each of the legs 15 and 16 through friction pins 27. Each link 26, as seen in FIGS. 2 and 3, is an extension of the leg upon which it is mounted, either leg 15 or 16, and can be independently swung to the right or left of the longitudinal axis of said leg, about its friction pin 27.

The pin pressure is such that the link 26 will be maintained in whatever position it may be swung to, until intentionally moved.

An upright fork 28 is tiltably mounted on each link 26 through a friction pin 29, and a platform 17 or 18, to be described hereinafter, is mounted on the fork 28. The fork 28, and its supported platform, is tiltable in a vertical plane, toward or away from the long axis of the link 26, as seen in FIG. 3.

Reference numeral 18 indicates a flat platform having three spaced clips 25, adapted to releasably hold a conventional reel type fishing rod 24, as seen in FIG. 1.

Reference numeral 17 indicates a curved platform, substantially U-shaped in configuration, having two spaced clips 25, adapted to releasably hold a spinner-reel type fishing rod 23, as again seen in FIG. 1.

The so-held fishing rods can be tilted both vertically and horizontally relative to the lid of the tackle box 20, as indicated by the arrows associated with the fishing rod ends in FIG. 1.

As stated hereinbefore, the bracket 14 can be folded flat against the tackle box lid 21 when not in use, for convenient carrying by the lid handle 22.

When in use, the legs 15 and 16 are swung upward at an angle and supported on the foot 19, as again seen in FIG. 1.

A fishing rod of either the plain reel or spinner reel type is engaged with the platform clips 25. The so-held rod can be moved in both horizontal and vertical planes, relative to the tackle box lid, and is held in such adjusted position by the friction pins 27 and 29.

With the fishing rod holder 10, just described, it is possible to maintain the held rods at a high angle that will permit the rod to clear a fence, or the like, that is often present along a pier or causeway extending out into the body of water being fished. As soon as a bite is observed, the rod can be quickly and easily lifted from its retaining clips 25, and manipulated in the usual manner.

I claim:
1. A fishing rod holding attachment for a tackle box, comprising:
 (a) a base, adapted to be mounted on the tackle box lid, adjacent to and spaced from the handle thereof;
 (b) a U-shaped bracket, hingedly mounted on the base, whose legs can be swung in a vertical plane, away from or toward the box lid;
 (c) a foot mounted on one of the legs, movable between a first position, wherein it is parallel to the long axis of the leg, and a second position, wherein it depends from the leg and rests on the tackle box lid; the bracket legs being parallel to the tackle box lid when the foot is in its first position, and angularly inclined upwardly therefrom when the foot is in its second position;
 (d) a fishing rod holding platform mounted on each bracket leg, through swivel means, for movement in both vertical and horizontal planes, relative to the bracket leg; and
 (e) a plurality of spaced clips mounted on each platform, adapted to releasably hold a fishing rod laid thereacross.

2. A fishing rod holding attachment for a tackle box, as in claim 1, wherein the swivel means comprises:
 (a) an extension link, pivotally mounted at the terminal end of each bracket leg through a friction pin, and adapted to be swung in a horizontal plane to the right or left of the longitudinal axis of the bracket leg; and
 (b) a platform supporting fork, tiltably mounted on the extension link through a friction pin; the fork and its supported platform being tiltable in a vertical plane, toward or away from the longitudinal axis of the extension link.

References Cited
UNITED STATES PATENTS

| | | | |
|---|---|---|---|
| 2,555,073 | 5/1951 | Zdankoski | 43—21.2X |
| 2,596,403 | 5/1952 | Hoffman | 43—21.2 |
| 3,095,663 | 7/1963 | Miller | 43—21.2 |
| 3,327,978 | 6/1967 | Gates | 248—42 |

SAMUEL KOREN, Primary Examiner

D. J. LEACH, Assistant Examiner

U.S. Cl. X.R.

43—21.2; 248—42